United States Patent
Ohhashi

(10) Patent No.: US 7,522,489 B2
(45) Date of Patent: Apr. 21, 2009

(54) INITIALIZATION METHOD, REPRODUCTION METHOD, COMPUTER-EXECUTABLE PROGRAM PRODUCT, COMPUTER-READABLE RECORDING MEDIUM, DATA STRUCTURE, INFORMATION RECORDING APPARATUSES, AND INFORMATION REPRODUCING APPARATUS

(75) Inventor: Naoya Ohhashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 717 days.

(21) Appl. No.: 11/102,688

(22) Filed: Apr. 11, 2005

(65) Prior Publication Data

US 2005/0235104 A1   Oct. 20, 2005

(30) Foreign Application Priority Data

Apr. 12, 2004   (JP)   ............................. 2004-116503

(51) Int. Cl.
G11B 20/10   (2006.01)
G11B 20/18   (2006.01)
G11B 20/12   (2006.01)

(52) U.S. Cl. ................ 369/47.14; 369/53.17; 369/59.25

(58) Field of Classification Search ................. None
See application file for complete search history.

(56) References Cited

U.S. PATENT DOCUMENTS

| | | | |
|---|---|---|---|
| 6,243,338 B1 * | 6/2001 | Mine | 369/47.1 |
| 6,625,096 B1 * | 9/2003 | Arai | 369/47.34 |
| 6,678,226 B2 | 1/2004 | Horibata et al. | |
| 6,760,288 B2 * | 7/2004 | Ijtsma et al. | 369/53.18 |
| 6,996,666 B2 | 2/2006 | Sasaki | |
| 2001/0026511 A1 * | 10/2001 | Ueda et al. | 369/47.14 |
| 2002/0159353 A1 * | 10/2002 | Sasaki | 369/53.15 |
| 2003/0095484 A1 * | 5/2003 | Motohashi | 369/53.15 |
| 2003/0202443 A1 | 10/2003 | Nakagawa et al. | |
| 2003/0231568 A1 | 12/2003 | Ohhashi | |

FOREIGN PATENT DOCUMENTS

| | | |
|---|---|---|
| JP | 02-035663 | 2/1990 |
| JP | 06-267191 | 9/1994 |
| JP | 11-86418 | 3/1999 |
| JP | 2002-008320 | 1/2002 |
| JP | 2002-117627 | 4/2002 |
| JP | 2003-45117 | 2/2003 |
| JP | 2004-110964 | 4/2004 |

* cited by examiner

*Primary Examiner*—Joseph H Feild
*Assistant Examiner*—Christopher R Lamb
(74) *Attorney, Agent, or Firm*—Dickstein Shapiro LLP

(57) ABSTRACT

When an information recording medium is initialized, a block is determined to record the dummy data by referring to identification information for identifying a block recording user data and a block in which the user data are not recorded, and information concerning a last address of a recorded area continued from a beginning of the data zone. The dummy data is recorded to the block being determined in the step of determining a block to record dummy data.

20 Claims, 15 Drawing Sheets

FIG.3

| PHYSICAL SECTOR OF ECC BLOCK | MAIN DATA BYTE POSITION | DESCRIPTION | NUMBER OF BYTES |
|---|---|---|---|
| 0 | D0 TO D3 | IDENTIFICATION ID | 4 |
| 0 | D4 | BITMAP VALID FLAG | 1 |
| 0 | D5 TO D7 | RESERVED AND SET TO (00) | 3 |
| 0 | D8 TO D39 | DRIVE ID | 32 |
| 0 | D40 TO D43 | RESERVED AND SET TO (00) | 4 |
| 0 | D44 TO D47 | FORMATTING STATUS AND MODE | 4 |
| 0 | D48 TO D51 | LAST WRITTEN ADDRESS | 4 |
| 0 | D52 TO D55 | LAST VERIFIED ADDRESS | 4 |
| 0 | D56 TO D59 | BITMAP START ADDRESS | 4 |
| 0 | D60 TO D63 | BITMAP LENGTH | 4 |
| 0 | D64 TO D95 | DISC ID | 32 |
| 0 | D96 TO D127 | RESERVED AND SET TO (00) | 32 |
| 0 | D128 TO D2047 | RESERVED AND SET TO (00) | 1912 |
| 1 TO 9 | D0 TO D2047 | USER DATA BITMAP | 9 × 2048 |
| 10 TO 15 | D0 TO D2047 | RESERVED AND SET TO (00) | 6 × 2048 |

| DESCRIPTION | BYTE(S) |
|---|---|
| STATE 1 | 1 |
| DEFECTIVE BLOCK ADDRESS | 4 |
| STATE 2 | 1 |
| REPLACEMENT BLOCK ADDRESS | 4 |

FIG.6

| STATE 1 | STATE 2 | DESCRIPTION |
|---|---|---|
| 0000b | 000xb | VALID REPLACEMENT LIST. DATA IS REPLACED |
| 0001b | 0000b | VALID REPLACEMENT LIST. DATA IS NOT REPLACED |
| 0010b | 0000b | UNUSED REPLACEMENT LIST |
| 0011b | 0000b | DEFECTIVE REPLACEMENT LIST |
| OTHERS | OTHERS | RESERVED |

| STATE 2 | DESCRIPTION |
|---|---|
| 0000b | DEFECTIVE BLOCK RECORDS SAME DATA AS REPLACEMENT BLOCK |
| 0001b | DEFECTIVE BLOCK RECORDS DIFFERENT DATA FROM REPLACEMENT BLOCK |
| OTHERS | RESERVED |

INITIALIZATION METHOD, REPRODUCTION METHOD, COMPUTER-EXECUTABLE PROGRAM PRODUCT, COMPUTER-READABLE RECORDING MEDIUM, DATA STRUCTURE, INFORMATION RECORDING APPARATUSES, AND INFORMATION REPRODUCING APPARATUS

BACKGROUND OF THE INVENTION

1. Field of the Invention

The present invention generally relates to initialization methods, reproduction methods, computer-executable programs, recording media, data structures, information recording apparatuses, and information reproducing apparatuses, and more particularly to an initialization method for initializing an information recording medium, a data structure used in the initialization method, a reproduction method and an information reproducing apparatus for reproducing data from an information recording medium, an information recording apparatus for recording data to the information recording medium, a program product for use with the information recording apparatus, and a computer-readable recording medium recorded with a program.

2. Description of the Related Art

Since an optical disc such as a CD (Compact Disc), a DVD (Digital Versatile Disc), and a like used as an information recording medium to record data has becomes popular, an optical disc apparatus has been widely used as an information reproducing apparatus for recording data to the optical disc and reproducing data from the optical disc. An information recording apparatus and an information reproducing apparatus may be collectively called a drive unit.

A CD-R (Compact Disc Recordable) and CD-RW (Compact disc ReWritable) are used as a recordable CD, and a DVD-R (Digital Versatile Disc Recordable), a DVD+R, a DVD-RW, and a DVD+RW are used as a recordable DVD. Data are recorded and reproduced in accordance with a respective predetermined standard.

For example, for an initialization process (format process) of the optical disc, a background format process is applied for the DVD+RW. The background format process is different from a conventional format process used for the CD-RW. Just the main portion is formatted (hereinafter, called "initialize"). Dummy data are successively recorded to other portions from the beginning of data zone when there is no record request or reproduction request from an upper apparatus. Since this background format process can be cancelled at any time, the background format process is cancelled and the optical disc can be ejected. In this case, when a temporary read-out is additionally provided, the background format process can be compatible with the DVD-ROM. Also, without providing the temporary read-out, the optical disc can be ejected. In this case, recorded areas and non-recorded areas are mixed in the data zone. In the background format process, information showing a location where the format process ends is stored in a last written address (hereinafter, called LWA). Thus, the background format process can be resumed from an area indicated by an address next the LWA.

In the background format process, after the initialization ends, it is possible to record and reproduce data for whole area of the disc. Accordingly, when user data are recorded with respect to a non-format area, in order for a subsequent background format process not to rewrite data, most optical disc apparatuses have bitmap information used to determine whether an area is the non-recorded area or the recorded area.

By using the bitmap information, it becomes possible to determine whether the area is the non-recorded area or the recorded area. However, it cannot be determined that data recorded in the recorded area are dummy data. For example, in a case in that the reproduction request is made for an area where the format process ends and data recorded in the area cannot be normally reproduced, even if the data recorded in the area are dummy data, a reproduction error is informed. Then, a process at a user side is inconveniently interrupted. Moreover, disadvantageously, the optical disc can be determined as a disc having a read-out defect.

Accordingly, Japanese Laid-open Patent Application No. 11-86418 discloses to provide additional bitmap information used to determine whether data recorded in an area is the user data or the dummy data in addition to the bitmap information used to determined whether the data recorded in the area is the non-recorded area or the recorded area. The above-described problem can be solved by using this additional bitmap information. However, it is required to have two kinds of bitmap information. As a result, a larger capacity of memory configured in the optical disc apparatus is required and becomes a higher expense. In addition, since two kinds of bitmap information are individually checked, a performance can be degraded.

SUMMARY OF THE INVENTION

It is a general object of the present invention to provide initialization methods, reproduction methods, computer-executable programs, recording media, data structures, information recording apparatuses, and information reproducing apparatuses, in which the above-mentioned problems are eliminated.

A first specific object of the present invention is to provide an initialization method, a data structure, and an information recording apparatus, in which an information recording medium can be effectively initialized without requiring a higher expense.

A second specific object of the present invention is to provide a reproduction method and an information reproducing apparatus, in which data can be effectively reproduced from the information recording medium without requiring a higher expense.

A third specific object of the present invention is to provide a program product including program code executed a computer controlling the information recording apparatus and a computer-readable recording medium recorded with the program code, in which the information recording medium can be effectively initialized.

The above objects of the present invention are achieved by an initialization method for initializing an information recording medium including a data zone and a management information area storing management information of the data zone by recording dummy data by a block unit having a predetermined data size to a non-recorded area of the information recording medium, including the steps of: determining a block to record the dummy data by referring to identification information for identifying a block recording user data and a block in which the user data are not recorded, and information concerning a last address of a recorded area continued from a beginning of the data zone; and recording the dummy data to the block being determined in the step of determining a block to record dummy data.

According to the present invention, when the information recording medium is initialized by recording the dummy data by the block unit having the predetermined data size to the non-record area, by referring to the identification information for identifying the block recording the user data and the block where the user data are recorded, and the information concerning the last address of the recorded area continued from a beginning of the data zone, the block to record the dummy data is determined. Then, the dummy data are recorded to the determined block. Therefore, it is possible to easily determine whether data recorded in the recorded block are the user data or the dummy data. In addition, it is possible to continuously initialize the information recording medium without writing the dummy data over the user data. Accordingly, a higher expense is not required, and it is possible to effectively initialize the information recording medium.

In this case, the initialization method may further include the step of writing the identification information to the information recording medium.

In the initialization method, in the step of writing the identification information, when a possible area to write includes a defect, the identification information may be written to a new area, which is predetermined.

The initialization method may further include the step of setting the identification information when the user data are recorded, prior to the step of determining a block to record the dummy data.

The above objects of the present invention are achieved by a reproduction method for reproducing data recorded in an information recording medium by a block unit having a predetermined data size, said reproduction method including the steps of: initializing the information recording medium, wherein the step of initializing the information recording medium includes the steps of: determining a block to record dummy data by referring to identification information for identifying a first block recording user data and a second block in which the user data are not recorded, and information concerning a last address of a recorded area continued from a beginning of a data zone; recording the dummy data to the block being determined in the step of determining a block to record the dummy data; writing the identification information to the information recording medium; and setting the identification information when the user data are recorded, prior to the step of determining a block to record the dummy data, and checking whether or not a reproduction block including a subject area to reproduce is a block recording the user data, based on the identification information when the information recording medium is initialized, wherein the information recording medium, which is partially initialized in the step of initializing the information recording medium, is reproduced by the block unit.

According to the present invention, in a case in that the information recording medium is partially initialized in the initialization method at least, based on the identification information set in the initialization, it is determined whether or not the reproduction block is the block recording the user data. Therefore, it is possible to conduct a process corresponding to a type of data recorded in the reproduction block. Accordingly, as a result, a higher expense is not required, and it is possible to effectively reproduce data from the information recording medium.

The reproduction method may further include the step of setting the dummy data as the reproduction data when the reproduction block is a block recording the user data.

The reproduction method may further include the step of retrying a reproduction of the reproduction block when reproduction of the reproduction block is not normally completed, and the reproduction block is a block recording the user data.

The reproduction method may further include the step of informing error information when the reproduction of the reproduction block is not normally completed, and the reproduction block is a block recording the user data.

The reproduction method may further include the step of replacing the reproduction block with a replacement block in a replacement area, and recording the dummy data to the replacement block, when the reproduction of the reproduction block is not normally completed, and the reproduction block is not the block recording the user data, wherein the information recording medium includes the replacement area.

The above objects of the present invention are achieved by a program product for use with an information recording apparatus for recording data by a block unit having a predetermined block to an information recording medium including a data zone and a management information area storing management information of the data zone, said program product including a computer-executable program including the codes for: setting identification information for identifying a block recording user data and a block where the user data are not recorded, when an initialization process for recording dummy data to a non-recorded area of the information recording medium is interrupted, and the user data is recorded; and determining a block to record the dummy data by referring to the identification information and information concerning a last address of a recorded area continued from a beginning of the data zone, when the dummy data are recorded.

According to the present invention, in the program according to the present invention is loaded into a predetermined memory, and a start address of the program is set to a program counter, when an initialization of the information recording medium is interrupted and the user data are recorded, a computer for controlling the information recording apparatus sets the identification information for identifying the block recording the user data and the block where the user data are not recorded. Then, the computer obtain the block recording dummy data based on the identification information and the information concerning the last address of the recorded area continued from the beginning of the data zone. Therefore, by using a memory having the same capacity as the conventional memory, it is possible to easily determine whether the data recorded in the recorded area are the user data or the dummy data. In addition, without writing the dummy data over the user data, it is possible to continuously initialize the information recording medium. Accordingly, a higher expense is not required, and it is possible to effectively initialize the information recording medium.

The above objects of the present invention are achieved by a computer-readable recording medium recorded with a program for causing a computer as an information recording apparatus to record data by a block unit having a predetermined block to an information recording medium including a data zone and a management information area storing management information of the data zone, said program including the codes for: setting identification information for identifying a block recording user data and a block where the user data are not recorded, when an initialization process for recording dummy data to a non-recorded area of the information recording medium is interrupted, and the user data is recorded; and determining a block to record the dummy data by referring to the identification information and information concerning a last address of a recorded area continued from a beginning of the data zone, when the dummy data are recorded.

According to the present invention, by a computer executing the program, the higher expense is not required, and it is possible to effectively initialize the information recording medium.

The above objects of the present invention are achieved by a data structure of identification information for identifying a block recording user data and a block where the user data are not recorded, said data structure applicable to an information recording medium including data zone having a plurality of blocks, said data structure including an area including a plurality of bits corresponding to the plurality of the blocks, respectively, wherein each value of the plurality of bits shows whether or not the user data are recorded in a respective block of the plurality of blocks.

According to the present invention, the identification information includes the plurality of bits corresponding to the plurality of blocks, respectively, and "0" or "1" information of each bit indicates whether or not a respective block records the user data. By using the identification information, it is possible to easily identify the block recording the user data and the block where the data are not recorded. Accordingly, as a result, a higher expense is not required, and it is possible to easily initialize the information recording medium.

The above objects of the present invention are achieved by an information recording apparatus for recording data by a block unit having a predetermined block to an information recording medium including a data zone and a management information area storing management information of the data zone, said information recording apparatus including: a setting part setting identification information for identifying a block recording user data and a block where the user data are not recorded, when an initialization process for recording dummy data to a non-recorded area of the information recording medium is interrupted, and the user data is recorded; an address information obtaining part obtaining information concerning a last address of a recorded area continued from a beginning of the data zone; and determining part determining a block to record the dummy data by based on the identification information and the information concerning the last address of a recorded area continued from a beginning of the data zone, when the dummy data are recorded.

According to the present invention, in a case in that the initialization process of the information recording medium is interrupted and the user data are recorded, the setting part sets the identification information for identifying the block recording the user data and the block where the user data are not recorded. Moreover, the address information obtaining part obtains the information concerning the last address of the recorded area continued from the beginning of the data zone. Then, when the dummy data are recorded in the data zone, the determining part determines the block to record the dummy data based on the identification information and the information concerning the last address, and the recording part records the dummy data to the determined block. Therefore, a memory having the same capacity as the conventional memory can be used, and it is possible to easily determine whether the data recorded in the recorded block are the user data or the dummy data, and it is possible to write the dummy data over the user data. In addition, instead of writing the dummy data over the user data, it is possible to continuously initialize the information recording medium. Accordingly, a higher expense is not required, and it is possible to effectively initialize the information recording medium.

In the information recording apparatus, the identification information may include a plurality of bits corresponding to a plurality of the blocks, respectively.

The information recording medium may further include an information writing part writing the identification information to the information recording medium.

In the information recording apparatus, the information writing part may write the identification information to the management information area.

In the information recording apparatus, the information writing part may write the identification information to a new area, which is predetermined, when a possible area to write the identification information has a defect.

The information recording apparatus may further include a defect detection part detecting a defect in the data zone; and a replacing part replacing a defective block where the defect is detected by the defect detecting part with a replacement block in the replacement area, referring to the identification information, and recording the dummy data to the replacement block when the defective block is not the block where the user data are recorded, wherein the information recording medium includes a replacement area.

In the information recording apparatus, the management information includes a check information showing whether or not the identification information is valid; and the defect detecting part sets the check information to show that the identification information is invalid, when a defect detection in the data zone is completed.

The above objects of the present invention are achieved by an information reproducing apparatus for reproducing data recorded in an information recording medium by a block unit having a predetermined data size, said information reproducing apparatus including: an initialization part initializing the information recording medium, wherein the initialization part includes: a determining part determining a block to record dummy data by referring to identification information for identifying a first block recording user data and a second block in which the user data are not recorded, and information concerning a last address of a recorded area continued from a beginning of a data zone; a recording part recording the dummy data to the block being determined in the step of determining a block to record the dummy data; a writing part writing the identification information to the information recording medium; and a setting part setting the identification information when the user data are recorded, prior to the step of determining a block to record the dummy data, and a reproducing part reproducing a reproduction block including a subject area to reproduce; a checking part checking whether or not the reproduction block is a block recording the user data, based on the identification information which is set when the information recording medium is initialized; and a processing unit for conducting a process corresponding to at least one of a check result of the checking part and a reproduction result of the reproducing part, wherein the information recording medium, which is partially initialized in the step of initializing the information recording medium, is reproduced by the block unit.

According to the present invention, in a case in that the information recording medium is partially initialized in the initialization method according to the present invention, since the processing unit conducts a process corresponding to at least one of the check result of the checking part and the reproduction result by the reproducing part, it is possible to conduct a process corresponding to the type of the data recorded in the reproduction block. Accordingly, as a result, a higher expense is not required, and it is possible to effectively reproduce data from the information recording medium.

In the information reproducing apparatus, the processing unit may return the dummy data when the reproduction block is not the block recording the user data.

In the information reproducing apparatus, the processing unit may instruct a reproduction retry to the reproducing part, when a reproduction by the reproducing part is not normally completed, and the reproduction block is the block recording the user data.

In the information reproducing apparatus, the processing unit may inform error information when a reproduction by the reproducing part is not normally completed, and the reproduction block is the block recording the user data.

In the information reproducing apparatus, the information recording medium may include a replacement area; and the processing unit may replace the reproduction block with a replacement block in the replacement area, and may record the dummy data to the replacement block, when a reproduction by the reproducing part is normally completed, and the reproduction block is not the block recording the user data.

BRIEF DESCRIPTION OF THE DRAWINGS

In the following, embodiments of the present invention will be described with reference to the accompanying drawings.

FIG. 3 is a diagram for explaining a data structure of information to be stored in an Identification ID Area in FIG. 2, according to the embodiment of the present invention;

FIG. 6 is a diagram for explaining information showing a state 1 and a state 2 in FIG. 5, according to the embodiment of the present invention;

DESCRIPTION OF THE PREFERRED EMBODIMENT

Figure 1:
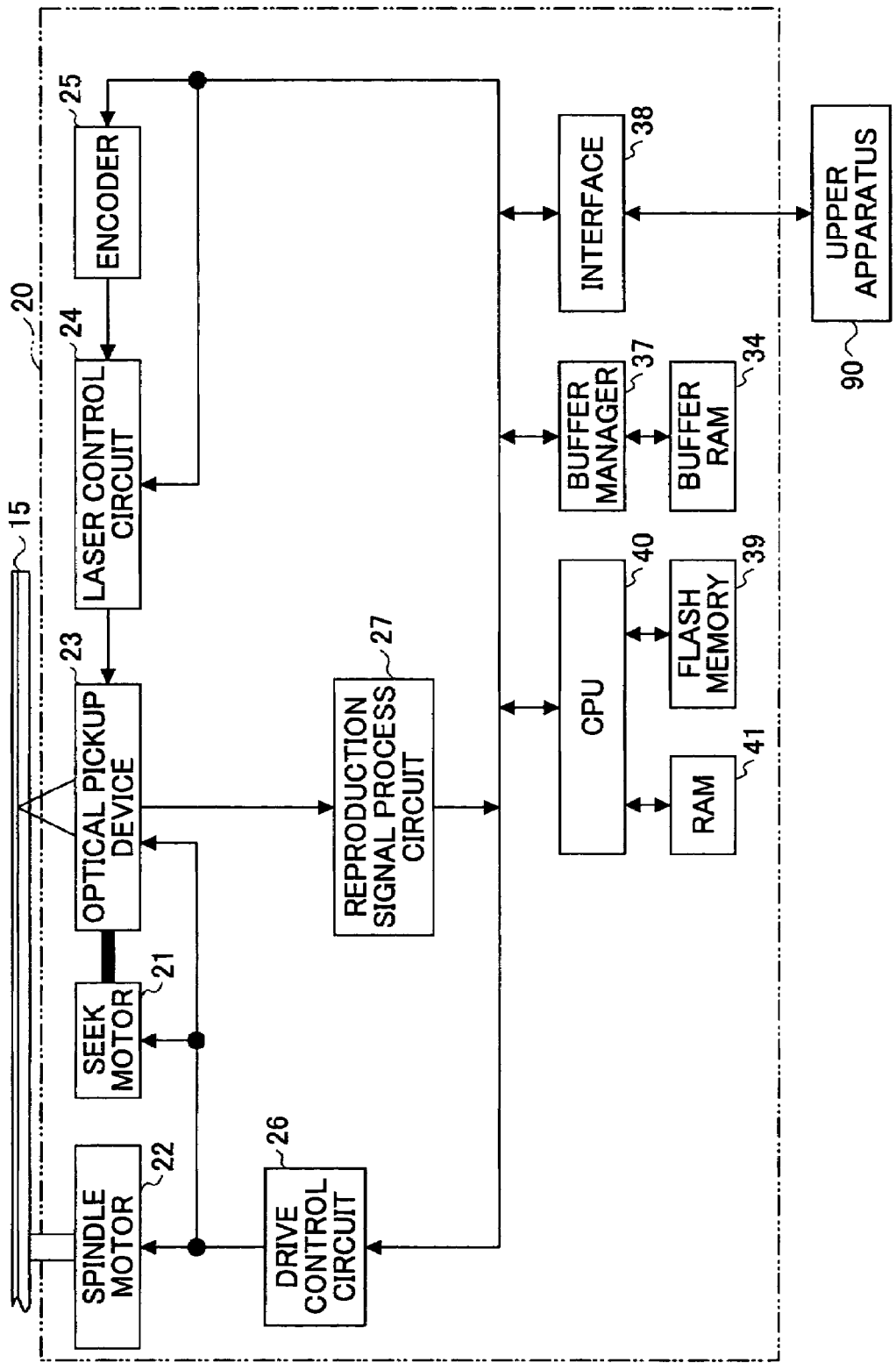
FIG. 1 is a block diagram showing a configuration of an optical disc apparatus according to an embodiment of the present invention.

In the following, an embodiment of the present invention will be described with reference to the accompanying drawings. FIG. 1 is a schematic diagram showing a configuration of an optical disc apparatus as an information recording apparatus and an information reproducing apparatus, according to a first embodiment of the present invention.

An optical disc apparatus 20 shown in FIG. 1 includes a spindle motor 22 for driving and rotating an optical disc 15, an optical pickup device 23, a seek motor 21 for driving the optical pickup device 23 in a sledge direction, a laser control circuit 24, an encoder 25, a drive control circuit 26, a reproduction signal process circuit 28, a buffer RAM (Random Access Memory) 34, a buffer manager 37, an interface 38, a flash memory 39, a CPU (Central Processing Unit) 40, and a RAM 41. In FIG. 1, arrows show flows of typical signals and information, but the arrows do not show all connection relationships among blocks. Moreover, in this embodiment, as an example, an information recording medium compliant with a standard of a DVD+RW is used for the optical disc 15. Furthermore, in this embodiment, data are recorded by one ECC (Error Correcting Code) block unit.

The optical pickup device 23 illuminates a laser light on a record surface of the optical disc 15 on which tracks are formed spirally or concentrically, and also receives a reflected light from the record surface. The optical pickup device 23 includes an optical system, a light receiver, a drive system, and a like. The optical system includes a semiconductor laser unit and an object lens, and leads a light flux emitted from the semiconductor laser unit to the record surface while leading a light flux reflected from the record surface to a predetermined light receiving position. The light receiver is arranged at the light receiving position and receives the light flux reflected on the record surface. The driving system includes a focusing actuator and a tracking actuator. The optical system, the light receiver, and the actuating system are not shown in FIG. 1. And a signal corresponding to an amount of light received is output from the light receiver to the reproduction signal process circuit 28.

The reproduction signal process circuit 28 obtains a servo signal (focus error signal, a track error signal, or a like), address information, synchronization signal, and an RF (Radio Frequency) signal. The servo signal obtained by the reproduction signal process circuit 28 is output to the drive control circuit 26, and the address information obtained by the reproduction signal process circuit 28 is output to the CPU 40, and the synchronization signal obtained by the reproduction signal process circuit 28 is output to the encoder 25. Moreover, the reproduction signal process circuit 28 conducts a decoding process and an error detection process with respect to the RF signal. After the reproduction signal process circuit 28 conducts an error correction process when the error is detected, the reproduction signal process circuit 28 stores the RF signal as reproduction data to the buffer RAM 34 through the buffer manager 37. A result of the error detection process (for example, PI error, PO error, or a like) is informed to the CPU 40, and the result is used to determine whether or not this data reproduction is normally conducted.

The drive control circuit 26 generates a drive signal of the tracking actuator for correcting a position displacement of the object lens concerning a tracking direction based on the track error signal from the reproduction signal process circuit 28, and also generates a drive signal of the focusing actuator for correcting a focus displacement of the object lens based on the focus error signal. Each of the drive signals generated by the drive control circuit 26 is output to the optical pickup device 23. Then, a tracking control and a focus control are conducted. Moreover, based on an instruction of the CPU 40, the drive control circuit 26 generates a drive signal to actuate the seek motor 21 and a drive signal to actuate the spindle motor 22. The drive signals are output to the seek motor 21 and the spindle motor 22, respectively.

The buffer RAM 34 temporarily stores data to record to the optical disc 15 and data reproduced from the optical disc 15. The buffer manager 37 manages an input and an output of data to/from the buffer RAM 34.

Based on an instruction of the CPU 40, the encoder 25 reads out data to record and accumulated in the buffer RAM 34 through the buffer manager 37 based on the instruction of the CPU 40. Then, the encoder 25 modulate data and additionally provides an error correction code, and generates a write signal to the optical disc 15. The write signal generated by the encoder 25 is output to the laser control circuit 24.

The laser control circuit 24 controls a power of a laser light emitted from the semiconductor laser unit configuring the optical pickup device 23. For example, when data are recorded, based on the write signal, a record condition, and an emission characteristic of the semiconductor laser, the drive signal of the semiconductor laser is generated by the laser control circuit 24.

The interface 38 is a bi-directional communication interface to an upper apparatus 90 (for example, a personal computer). The interface 38 is compliant to a standard interface such as ATAPI (AT Attachment Packet Interface), SCSI (Small Computer System Interface), USB (Universal Serial Bus), or a like.

The flash memory 39 includes a program area and a data zone. Programs including a program according to the present invention, which is described by code interpretable for the CPU 40, are stored in the program area of the flash memory 39. Also, the record condition, the emission characteristic of the semiconductor laser, and the like are stored in the data zone.

The CPU 40 controls each operation of the above-described devices in accordance with the program stored in the program area of the flash memory 39, and also stores data or a like necessary for a control, into the RAM 41 and the buffer RAM 34.

Figure 2:
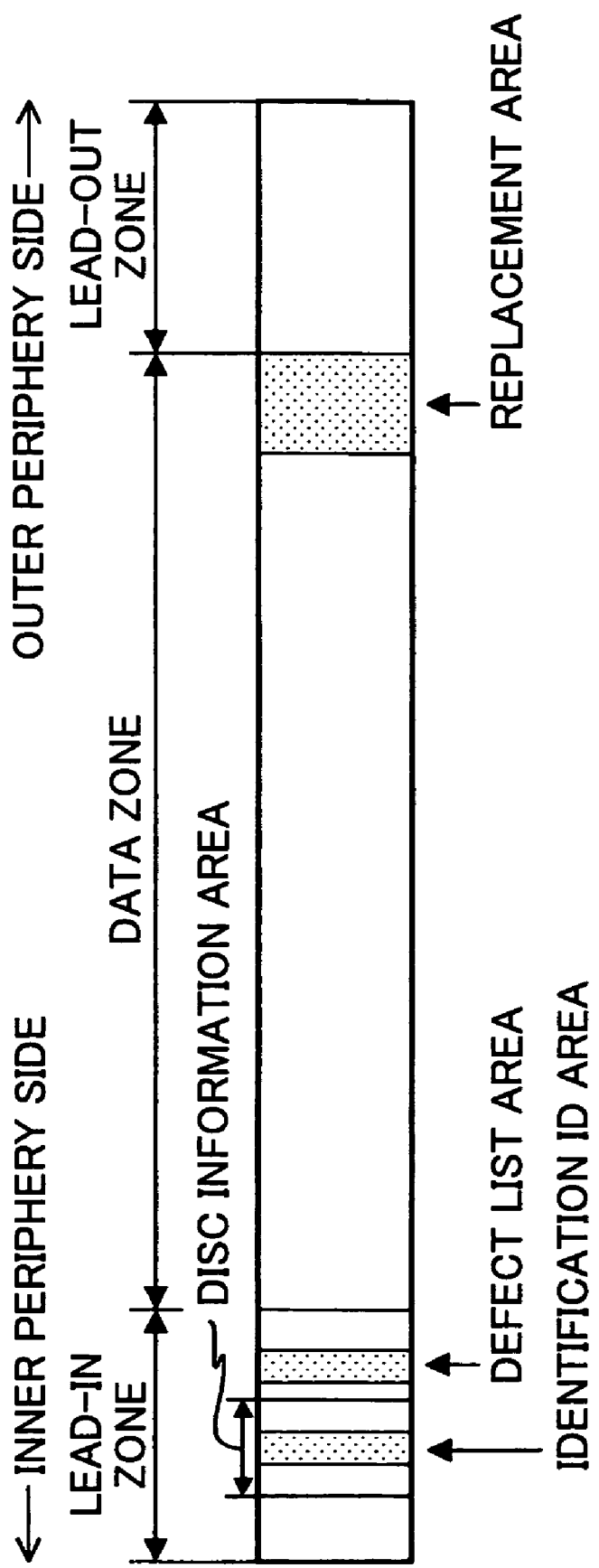
FIG. 2 is a diagram for explaining a layout of a recorded area on an optical disc in FIG. 1, according to the embodiment of the present invention.

Next, principle parts will be described about a layout (disc layout) of the recorded area in the optical disc 15. A spiral track is formed as the recorded area in the record surface. The recorded area is illustrated in FIG. 2. The recorded area is divided into a lead-in-zone, a data zone, and a lead-out zone, from an inner periphery side to an outer periphery side.

As shown in FIG. 2, the lead-in zone includes a disc information area and a defect list area as management information area to store management information of the data zone. The data zone records user data from the upper apparatus 90. Also, a replacement area is included in the data zone.

The disc information area includes an identification ID area where identification ID information as one type of the management information is stored. As shown in FIG. 3, the identification ID information has a data structure including an Identification ID, a Bitmap Valid Flag, a Drive ID, a Formatting Status and Mode, a Last Written Address (LWA), a Last Verified Address (hereinafter, called an LVA), a Bitmap Start Address, a Bitmap Length, a Disc ID, a User Data Bitmap as identification information, and a Reserved.

An ID showing that this management information is the identification ID information is stored in the identification ID. The Bitmap Valid Flag records information showing whether the user data bitmap is valid or invalid. For example, the user data bitmap is valid when the bitmap valid flag is "0", and is invalid when the bitmap valid flag is "1". The user data bitmap is set to be valid when a first background format process is started, and is set to be invalid when the defect detection process ends.

The Drive ID records a value individual to the drive unit being used. The Formatting Status and Mode records a state of the background format process. For example, when a bit 7 and a bit 6 of a D44 show "00", the D44 indicates that the format process has not been processed. When a bit 7 and bit 6 of the D44 show "10", the D44 indicates that the format process has completed.

The LWA records a last address of an area where user data or the dummy data are successively recorded form the beginning of the data zone. The LVA records a last address of an area where the defect detection process conducted after the background format process ends.

The Bitmap Start Address stores an address within the data zone corresponding to a first bit of the user data bitmap. The Bitmap Length records a count of ECC blocks within the data zone managed by the user data bitmap. The Disc ID records ID information being unique, which is generated by the drive unit.

The User Data Bitmap records information for identifying whether or not the data being recorded are the user data. Hereinafter, the information is called UD bitmap information. In the UD bitmap information, each bit corresponding to the ECC block within the data zone. The UD bitmap information has a data structure in that "0" is set to a bit corresponding an ECC block recording the user data. For example, when m ECC blocks (ECC block 1 through ECC block m) exist within the data zone, the UD bitmap information is formed by m bits. A 1st bit of the UD bitmap information corresponds to the ECC block 1, and a m-th bit of the UD bitmap information corresponds to the ECC block m (see FIG. 9).

The Reserved is a reserved area for the future, and all zeros are recorded to the reserved.

Figures 4, 5:
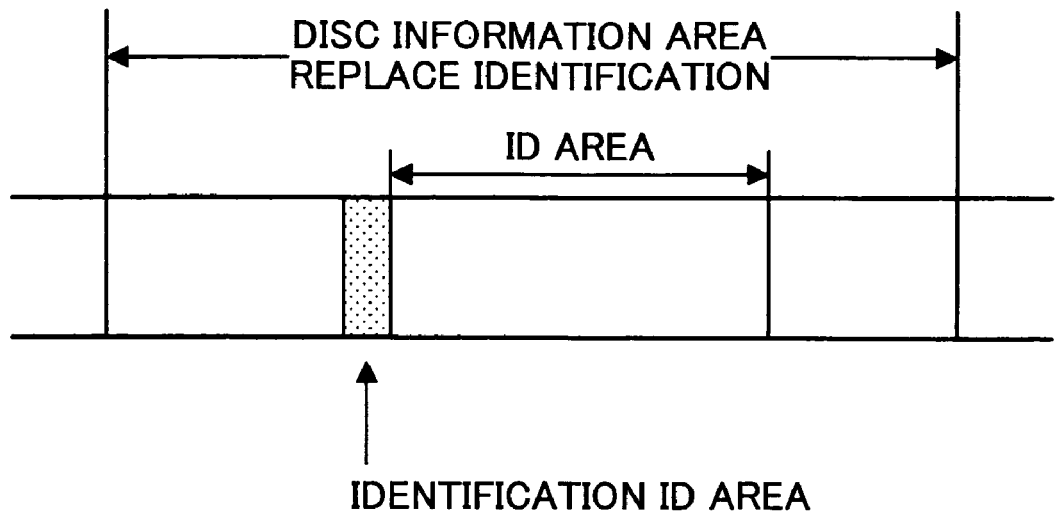
FIG. 4 is a diagram for explaining a Replacement Area of an Identification ID area in FIG. 2, according to the embodiment of the present invention.
FIG. 5 is a diagram for explaining a replacement list stored in a Defect List Area in FIG. 2, according to the embodiment of the present invention.

Moreover, as shown in FIG. 4, as one example, the disc information area includes a Replacement Area (hereinafter, alternatively called a Replace Identification ID area), which is used when the Identification ID Area becomes a defective area.

The Defect list area stores a plurality of replacement lists corresponding to respective ECC blocks included in the Replacement Area. As shown in FIG. 5, the replacement list includes a replacement block address being address information of a replacement block managed in the replacement list, a defective block address being address information of a defective block being replaced with the replacement block, and state information describing a state of the replacement list.

The state information is divided and stored into a state 1 and a state 2. As shown in FIG. 6, a combination of the state 1 and the state 2 shows a state of the replacement block. When the state 1="0000b", the state 1 shows that the defective block is assigned to the replacement block and data are replaced. In this case, when the state 2="0000b", the defective block records the same data as the replacement block. When the state 2="0001b", the defective block records data different from the replacement block. When the state 1="0001b", the defective block is assigned to the replacement block and data are not replaced. When the state 1="0010b", the defective block is not assigned and the state 1 shows that the replacement list is an unused replacement list. Furthermore, when the state 1="0011b", the replacement block is a defective block.

<<Background Format Process>>

Next, a process, which is conducted when the optical disc apparatus 20 configured as described above receives a command requesting the background process from the upper apparatus 90, will be described with reference to FIG. 7. In this case, the command may be alternatively called a BGF command. A flowchart shown in FIG. 7 corresponds to a sequence of process algorithms executed by the CPU 40. It should be noted that the optical 15 is a blank disc.

Figure 7:
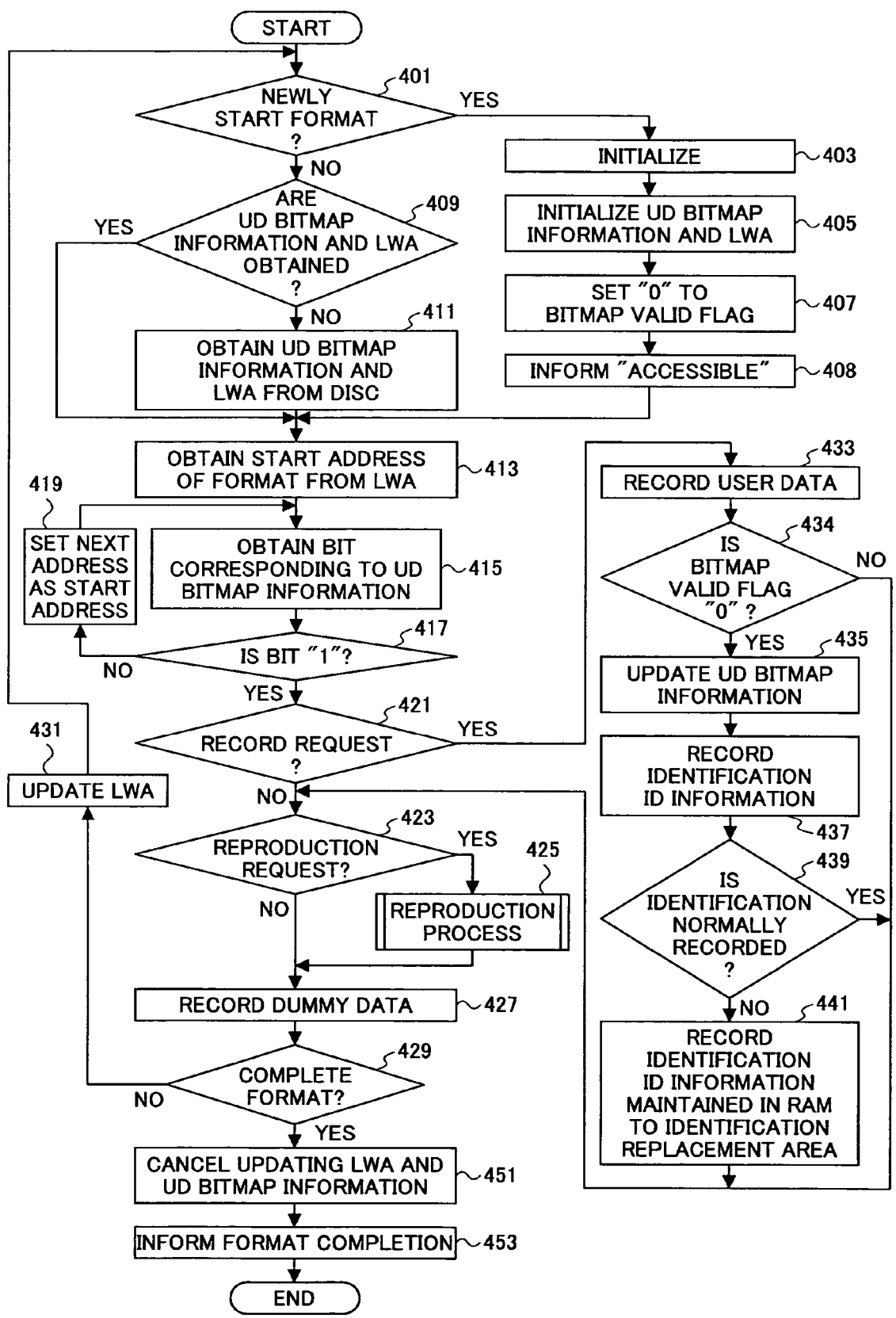
FIG. 7 is a flowchart for explaining a background format process, according to the embodiment of the present invention.

When the optical disc apparatus 20 receives the BGM command from the upper apparatus 90, a start address of a program (hereinafter, called a BGM program) corresponding to the flowchart in FIG. 7 is set to a program counter of the CPU 40, and the BGF program is activated. It is assumed that an eject request of a disc in a middle of a BGF process. A communication with the upper apparatus 90 is conducted by an interruption process to send and receive information. When the optical disc apparatus 20 receives a command (Write Command) requesting to record (hereinafter, alternatively called a record request command) from the upper apparatus 90, a record request flag is set to be "1" by the interruption process. Then, when the optical disc apparatus 20 receives a command (Read Command) requesting to reproduce (hereinafter, alternatively called a reproduction request command) from the upper apparatus 90, a reproduction request flag is set to be "1" by the interruption process. When the BGF program is activated, the record request flag and the reproduction request flag are set to be "0".

In a first step 401, it is determined whether or not the BGF process is newly conducted. In this case, since the optical disc 15 is a blank disc, this determination result becomes positive and the process advances to step 403.

In the step 403, an initialization is activated.

Figure 8:
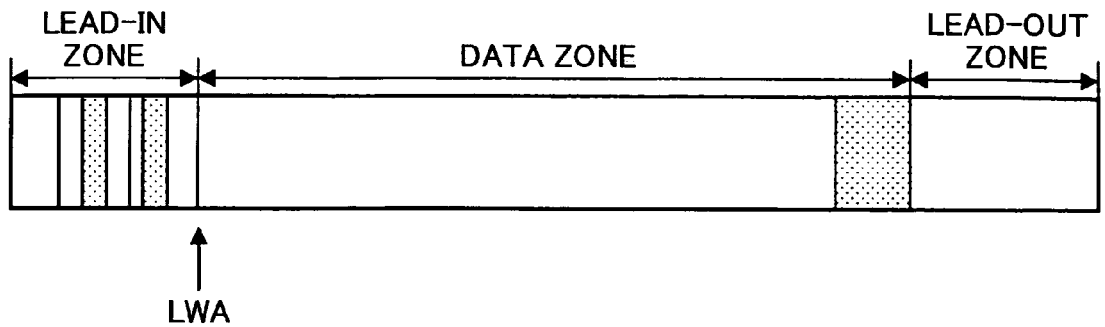
FIG. 8 is a diagram for explaining an initialization state of an LWA in the background format process, according to the embodiment of the present invention.
Figure 9:
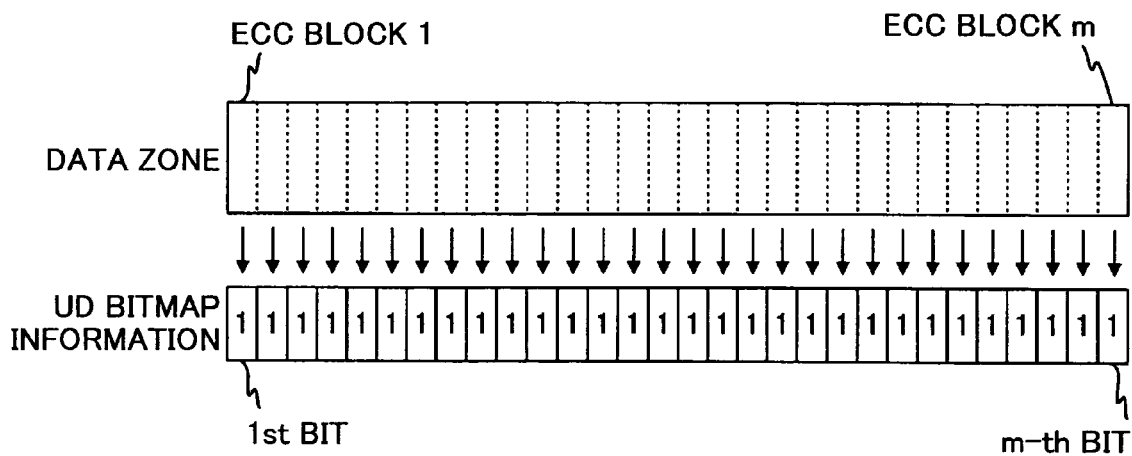
FIG. 9 is a diagram for explaining an initialization state of UD bitmap information in the background format process according to the embodiment of the present invention.

In the next step 405, the LWA and UD bitmap information are initialized. That is, as shown in FIG. 8, the start address of the data zone is set to the LWA. Also, as shown in FIG. 9, each of flags of the UD bitmap information is set to be "1".

In the next step 407, the bitmap valid flag is set to be "0". That is, the UD bitmap information becomes valid.

In the next step 408, the process informs the upper apparatus 90 that it is possible to access the optical disc apparatus 20 to record or reproduce data.

In the next step 413, the process obtains the start address of the format process from the LWA.

In the next step 415, the process retrieves a bit corresponding to the ECC block to which the start address of the format process belongs, from the UD bitmap information.

In the next step 417, it is determined whether or not the bit retrieved from the UD bitmap information shows "1". When the bit shows "0", this determination is negative, the process advances to step 419.

In step 419, a next address of the start address is set to be a new start address, and the process goes back to the step 415.

In the following, until the bit corresponding to the ECC block to which the start address belongs becomes "1", the step 415, step 417, and step 419 are repeated.

If the bit corresponding to the ECC block to which the start address belongs shows "1", a determination in the step 417 is positive, and the process advances to step 421.

In a next step 421, the process refers to the record request flag, and determines whether or not the record request is received from the upper apparatus 90. If the record request flag is "0", this determination is negative, and the process advances to step 423.

In the step 423, the process refers to the reproduction request flag, and determines whether or not the reproduction request is received from the upper apparatus 90. If the reproduction request flag is "0", this determination is negative, and the process advances to step 427.

In the step 427, dummy data are recorded to one ECC block which beginning address of the start address. That is, the format process is conducted.

In step 429, it is determined whether or not the format process is completed. If the format process is completed, this determination is negative, and the process advances to step 431.

In the step 431, the LWA is updated. Then, the process goes back to the step 401. In this case, since the format process has already started, this determination is negative, and the process goes to step 409.

In the step 409, the LWA and the UD bitmap information are read out from the optical disc 15, and it is determined whether or not the LWA and the UD bitmap information are stored in the RAM 41. If the LWA and the UD bitmap information are stored, this determination is positive, the process goes to the step 413. On the other hand, if the LWA and the UD bitmap information are not stored, this determination is negative, and the process goes to step 411. In the step 411, the LWA and the UD bitmap information are read out from the optical disc 15, and stored in the RAM 41. In this case, the Replace Identification ID Area is searched from the most end, and information stored in an area, which is the first area possible to reproduce, is stored in the RAM 41. Then, the process goes to the step 413.

After that, the format process is repeated until the determination of one of the step 421, the step 423, and the step 429 becomes positive.

Figure 10:
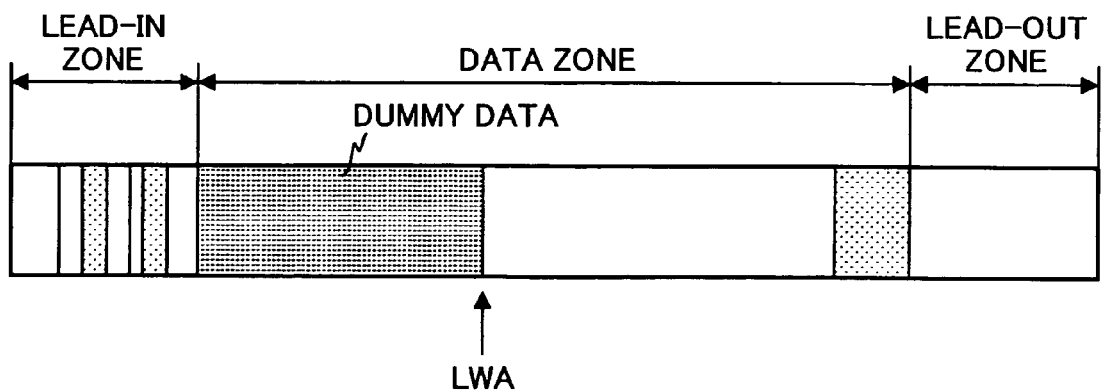
FIG. 10 is a diagram for explaining the LWA in the middle of the background format process according to the embodiment of the present invention.

Before the format process is completed, when the record request command is received form the upper apparatus 90, the determination in the step 421 becomes positive. The process resets the record request flag to be "0", and then goes to step 433. In this case, the dummy data are recorded in the middle of the data zone (see FIG. 10).

In the next step 433, the user data are recorded.

In the next step 434, it is determined whether or not the bitmap valid flag is "0". In this case, since the bitmap valid flag is "0", this determination is positive, and the process goes to step 435.

Figure 11:
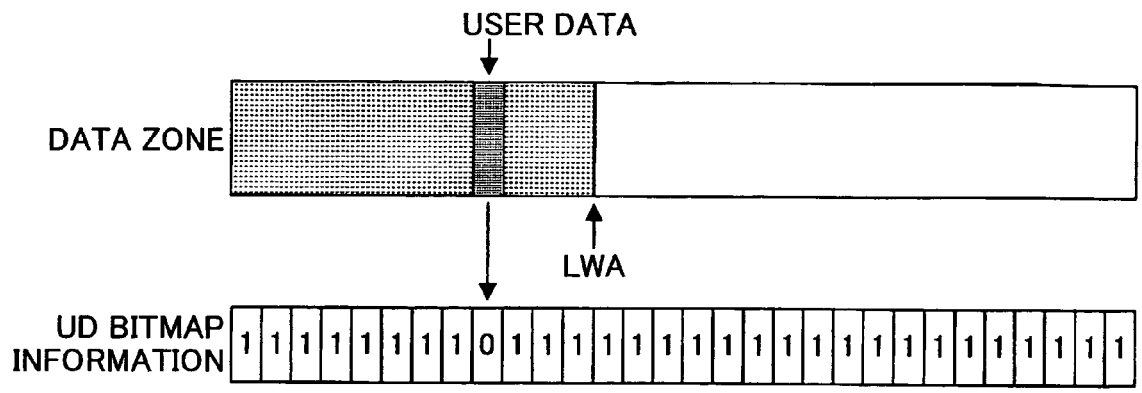
FIG. 11 is a diagram for explaining the UD bitmap information in the middle of the background format process according to the embodiment of the present invention.

In the step 435, the UD bitmap information is updated. That is, as one example, as shown in FIG. 11, the bit corresponding to the ECC block, in which the user data are recorded, is changed to be "0".

In the next step 437, the identification ID information including the UD bitmap information being updated is recorded to the Identification ID Area.

In the next step 439, it is determined whether or not the identification ID information is normally recorded. If the identification ID information is normally recorded, this determination is positive, and the process goes to the step 423. On the other hand, the identification ID information is not normally recorded, this determination is negative, and the process goes to step 441.

Figure 12A:
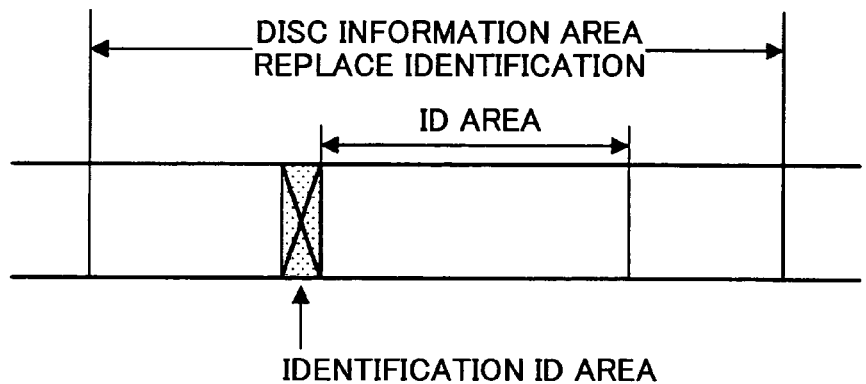
FIG. 12A and FIG. 12B are diagrams for explaining a replacement of an Identification ID Area according to the embodiment of the present invention.
Figure 12B:
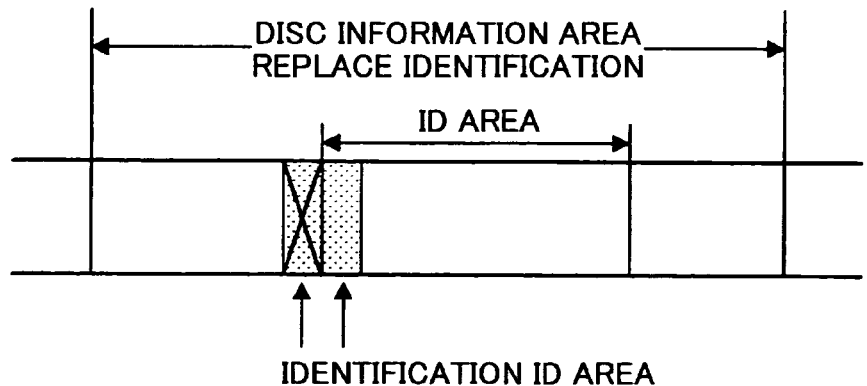

In this step 441, the identification ID information maintained in the RAM 41 is recorded in the Replace Identification ID Area (see FIG. 12A and FIG. 12B).

Moreover, before the format process is completed, when the reproduction request command is received from the upper apparatus 90, the determination in the step 423 becomes positive. After the process resets the reproduction request flag to be "0", the process goes to step 425. In the step 425, the reproduction process is conducted. The reproduction process will be described later in detail. Then, the process goes to the step 427.

Figure 13:
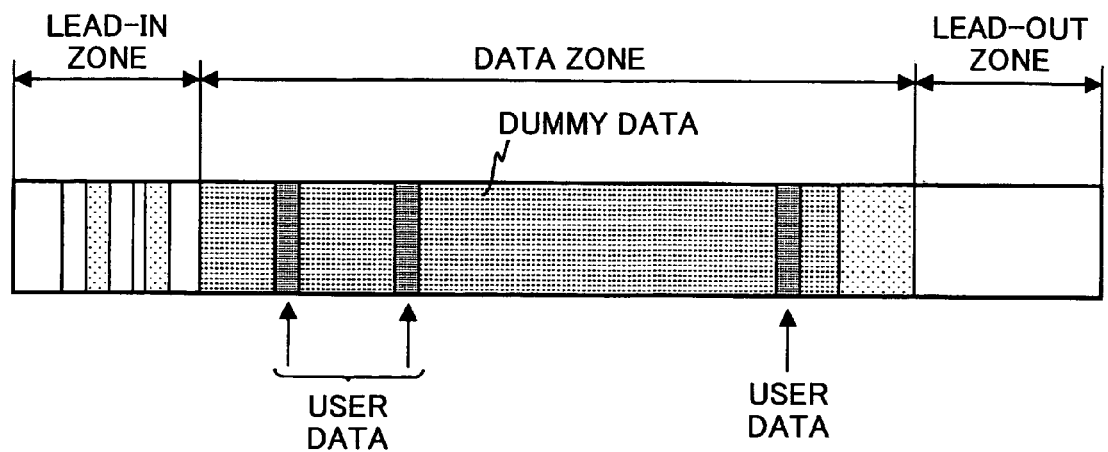
FIG. 13 is a diagram for explaining a completion of the background format process according to the embodiment of the present invention.

Next, as shown in FIG. 13, as one example, if there is no non-recorded area within the data zone, the format process is completed. Then, the determination in the step 429 is positive, and the process goes to step 451.

Figure 14:
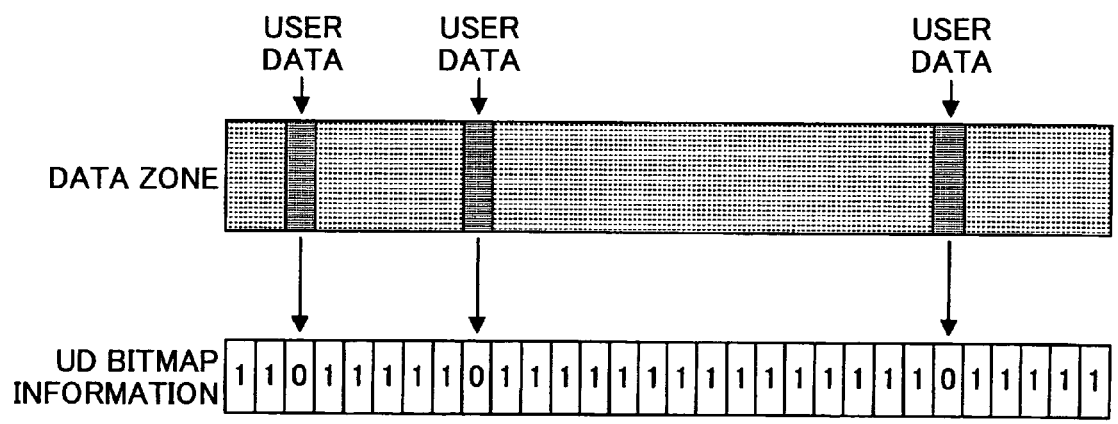
FIG. 14 is a diagram for explaining the UD bitmap information in a case shown in FIG. 13, according to the embodiment of the present invention.

In this step 451, updates of the LWA and the UD bitmap information are cancelled. As one example, as shown in FIG. 14, the bit corresponding to the ECC block, in which the user data are recorded, is set to be "0" in the UD bitmap information.

In the next step 453, the completion of the format process is informed to the upper apparatus 90. Then, the process conducted when BGF command is received from the upper apparatus 90 ends.

In the step 434, if the bitmap valid flag is "1", this determination is negative, and the process goes to the step 432. That is, the UD bitmap information is not updated.

<<Reproduction Process>>

Figure 16:
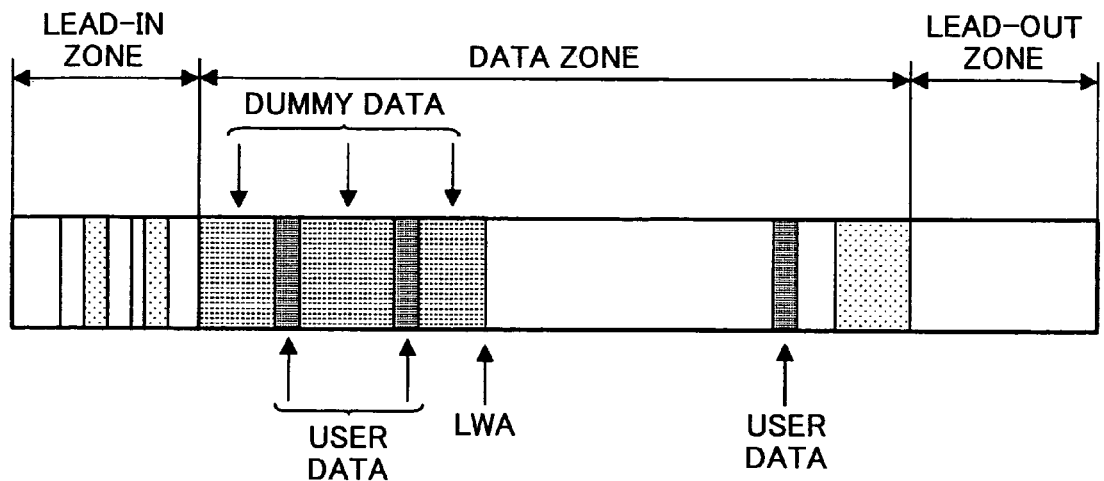
FIG. 16 is a diagram for explaining a data zone when the reproduction process in FIG. 7 is executed, according to the embodiment of the present invention.
Figure 17:
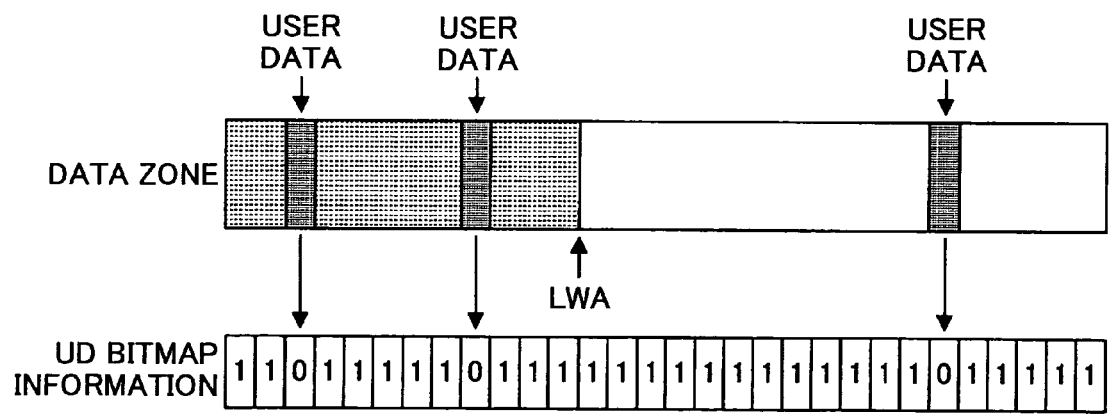
FIG. 17 is a diagram for explaining the UD bitmap information when the reproduction process in FIG. 7 is executed, according to the embodiment of the present invention.

The reproduction process conducted in the step 425 will be described with reference to FIG. 15. A flowchart shown in FIG. 15 corresponds to a series of process executed by the CPU 40. As shown in FIG. 16, as one example, areas recording the dummy data zone s recording the user data, and the non-recorded area are mixed. Also, as shown in FIG. 17, as one example, the bit corresponding to the ECC block recording the user data is set to be "0", and the bits corresponding to the ECC blocks recording the dummy data and the ECC blocks which are not recorded are set to be "1", in the UD bitmap information.

In the first step 501, an initial value "0" is set to a retry count value.

In the next step 503, a reproduction of an indicated area showing a reproduction address is instructed. In this embodiment, the size of the indicated area is one ECC block.

In the next step 505, based on a result of an error detection process informed from the reproduction signal process circuit 28, it is determined whether or not the reproduction of the indicated area is normally conducted. For example, if an error rate exceeds a predetermined value, it is determined that the reproduction of the indicated area is not normally conducted. Accordingly, this determination is negative, and the reproduction process advances to step 506.

In the step 506, it is determined whether or not the bitmap valid flag is "0". In this case, since the bitmap valid flag is "0", this determination is positive, and the reproduction process goes to step 507.

In the step 507, a bit corresponding to the indicated area is retrieved from the UD bitmap information.

In the step 509, it is determined whether or not the retrieved bit is "0". That is, it is determined whether or not data recorded in the indicated area are the user data. If the bit is "0", this determination is positive, and the reproduction process goes to step 511.

In the step 511, the retry count value is incremented by 1.

In the next step 513, it is determined whether or not the retry count value is less than or equal to a predetermined value N. If the retry count value is less than or equal to the predetermined value N, this determination is positive, and the reproduction process goes back to the step 503. That is, a reproduction retry is conducted. On the other hand, if the retry count value is more than the predetermined value N, this determination is negative, and the reproduction process goes to step 515.

In the step 515, an error is informed to the upper apparatus 90. Then, the reproduction process is terminated.

It should be noted that in the step 509, if the bit is "1", this determination is negative, and the reproduction process goes to step 517.

In the step 517, the indicated area is registered to the unused replacement list (replacement list in which the state 1 is "0010b"). Accordingly, the replacement block is determined for the indicated area.

In the next step 519, the dummy data are recorded to the replacement block of the indicated area.

In the next step 521, the dummy data are returned to the upper apparatus 90.

In the next step 525, the end of the reproduction process is informed to the upper apparatus 90.

Moreover, in the step 505, if the reproduction of the indicated area is normally conducted, this determination is positive, and the reproduction process goes to step 523. In the step 523, reproduction data are transferred to the upper apparatus 90. Then, the reproduction process goes to the step 525.

In the step 506, if the bitmap valid flag is "1", this determination is negative, and the reproduction process goes to the step 511.

<<Defect Detection Process>>

Figure 18:
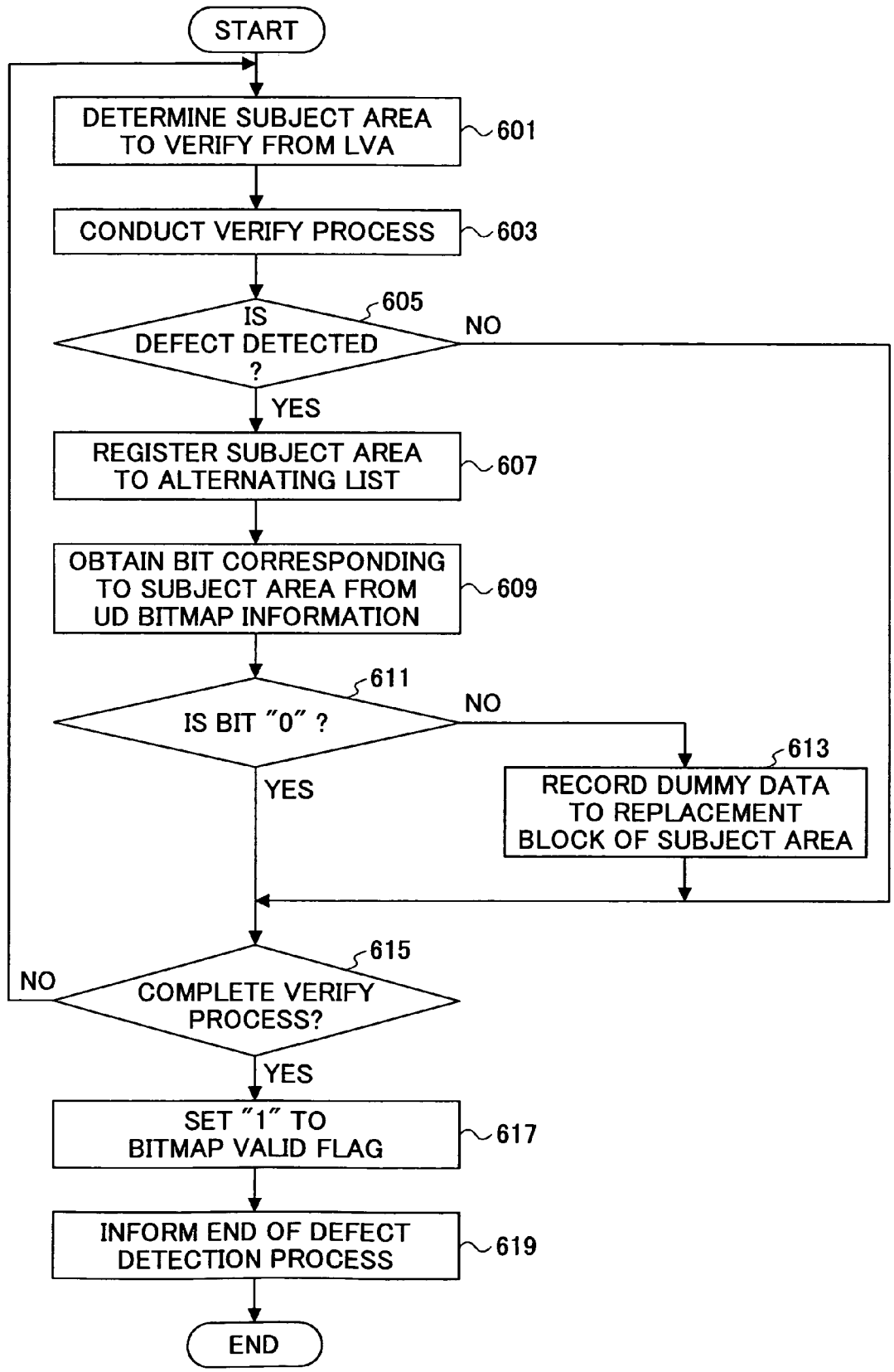
FIG. 18 is a flowchart for explaining a defect detection process after the background format process according to the embodiment of the present invention.

Next, the defect detection process, which is conducted after the BGF process is completed, will be described with reference to FIG. 18. A flowchart shown in FIG. 18 corresponds to a series of process algorithms executed by the CPU 40. The defect detection process is set to be conducted consecutively when the BGF process is completed.

In the first step 601, based on the LVA, a subject area for a verify process is determined.

In the next step 603, the verify process is conducted for the subject area determined in the step 601. The VLA is updated.

In the next step 605, based on a result of the verify process, it is determined whether or not the subject area has a defect. For example, if the error rate, which occurs when the subject area is reproduced, exceeds a predetermined value, it is determined that the subject area includes a defect. Accordingly, this determination is positive and the defect detection process goes to step 607.

In the step 607, the subject area is registered to the unused replacement list (replacement list in which the state 1 is "0010b"). Accordingly, the replacement block is determined for the subject area.

In the next step 609, the bit corresponding to the subject area is retrieved from the UD bitmap information.

In the next step 611, it is determined whether or not the retrieved bit is "0". That is, it is determined whether or not the data recorded in the subject area are the user data. If the bit is "1", this determination is negative, and the defect detection process goes to step 613.

In the step 613, the dummy data are recorded to the replacement block for the subject area.

In the next step 615, the LVA is referred, and it is determined whether or not the verify process is completed. If there are areas where the verify process has not been conducted, this determination is negative, and the defect detection process goes back to the step 601.

In the step 611, if the bit is "0", this determination is positive, and the defect detection process goes to the step 615. That is, the dummy data are not recorded to the replacement block of the subject area.

Moreover, in the step 605, if a defect is not detected, this determination is negative, and the defect detection process goes to the step 615.

After that, until the verify process is completed, the above-described steps are repeated. When the verify process is completed, the determination in the step 615 is positive, and the defect detection process goes to step 617.

In the step 617, the bitmap valid flag is set to be "1". That is, the UD bitmap information is set to be invalid.

In the next step 619, the end of the defect detection process is informed to the upper apparatus 90. Then, the defect detection process is terminated.

<<Reproduction Process After Completion of BGF>>

Figure 15:
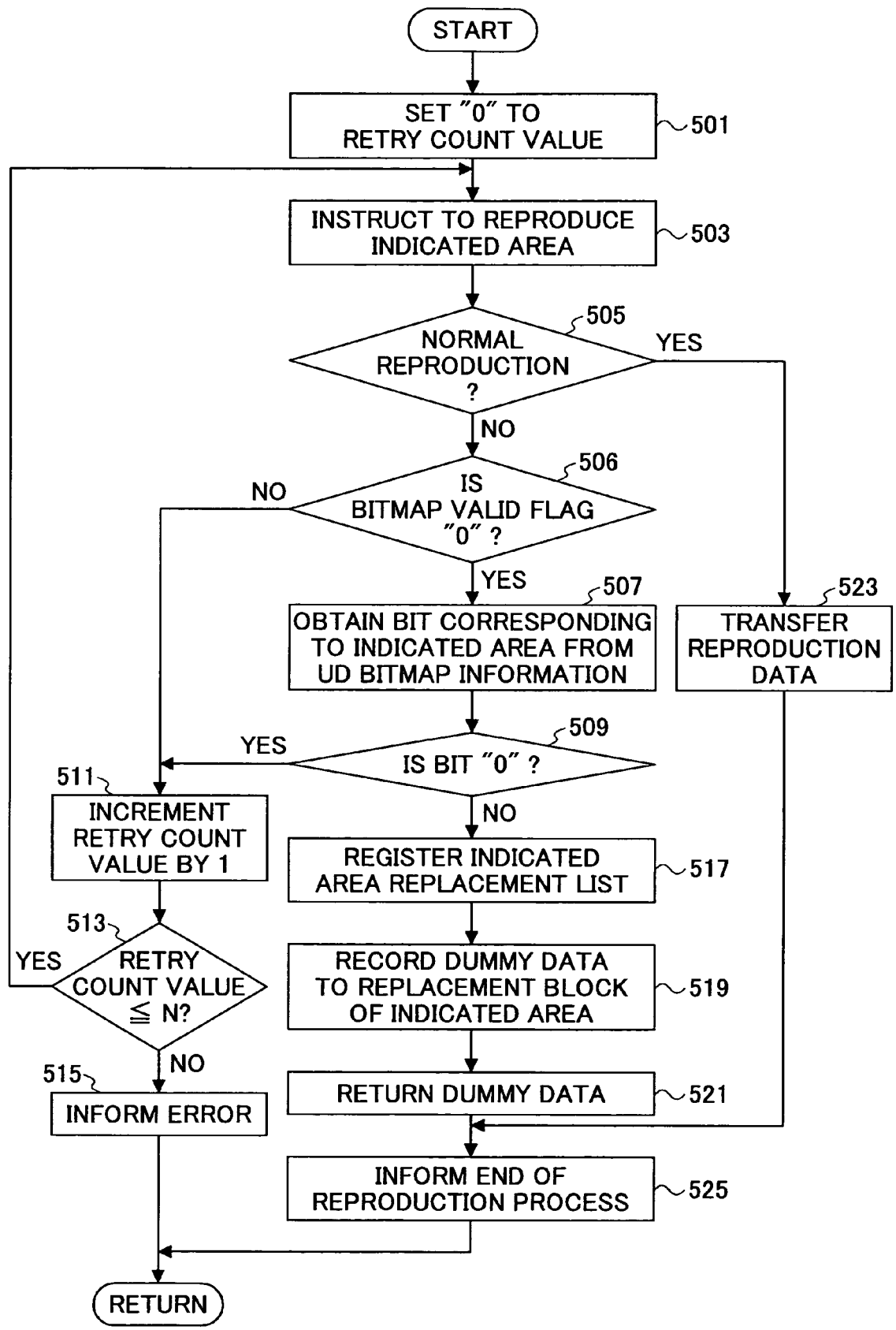
FIG. 15 is a flowchart for explaining a reproduction process in FIG. 7, according to the embodiment of the present invention.

It should be noted that after the completion of the BGF, when the reproduction request command is received from the upper apparatus 90, a program conducting the same process as the process shown in FIG. 15 is activated.

<<Record process After Completion of BGF>>

Also, after the completion of the BGF, when the record request command is received from the upper apparatus 90, a program conducting the same processes as processes in the step 433 through the step 441 in the BGF process is activated.

As seen in the above-descriptions, in the optical disc apparatus 20 according to the present invention, a recording part, a replacing part, and a processing unit are formed by the encoder 25, the laser control circuit 24, the optical pickup device 23, the CPU 40, and the programs executed by the CPU 40. Moreover, a setting part, an address information obtaining part, a determining part, an information writing part, a defect detecting part, and a checking part can be realized by the CPU 40, and the programs executed by the CPU 40. That is, the setting part can be realized by a process in the step 435 in FIG. 7, the address information obtaining part can be realized by a process in the step 431 in FIG. 7, the determining part can be realized by processes in the step 413 through the step 419 FIG. 7, the information writing part can be realized by a process in step 437 in FIG. 7, the defect detecting part can be realized by processes in step 601 through the step 619 in FIG. 18, and the checking part can be realize by processes in steps 507 and 509 in FIG. 19. Furthermore, a reproducing part can be realized by the reproduction signal process circuit 28. Alternatively, the parts and units realized by the processes in accordance with the programs executed by the CPU 40 may be partially or entirely configured by hardware.

Also, in this embodiment, the program according to the present invention in the BGF program is executed in programs stored in the flash memory 39. That is, steps according to a program corresponding to a process in the step 435 in FIG. 7 is executed, and steps according to a program corresponding to processes in the step 413 through the step 419 in FIG. 7 are executed.

Then, the initialization method according to the present invention is implemented in the BGF process. That is, a determining step is implemented in processes in the step 413 through the step 419 in FIG. 7, a recording step is implemented in process in the step 427 in FIG. 7, a writing step is implemented in a process in step 437 in FIG. 7, and a setting process is implemented in a process in the step 435 in FIG. 7. Moreover, in the reproduction process after the reproduction process in the BGF process and the BGF are completed, the reproduction method according to the present invention is implemented. That is, a checking step is implemented in processes in the steps 507 and 509 in FIG. 15.

As described above, in the optical disc apparatus 20 according to the present invention, when the format process (initialization) of the optical disc 15 (information recording medium) is interrupted and the user data are recorded, the UD bitmap information (identification information) is set in order to identify a block recording the user data and a block which does not record the user data. Moreover, information concerning the last address of a recorded area, which is continued from the beginning of the data zone, is set to the LWA. Accordingly, when the dummy data are recorded in the data zone, a block to record the dummy data is determined based on the UD bitmap information and the LWA. That is, an area at the inner peripheral side more than the LWA is the recorded area recording data, and it can be determined based on the UD bitmap information whether an area at the outer peripheral side more than the LWA is the recorded data or the non-recorded area. Moreover, when a recorded block in the data zone is reproduced, it can be recognized based on the UD bitmap information whether the data are the user data or the dummy data. That is, even if the same capacity of the memory as that of a conventional memory is applied, it is possible to easily determine whether the data recorded in the recorded block are the user data or the dummy data, and it is possible to continue initializing the optical disc, instead of rewriting the user data with the dummy data. Therefore, it is possible to suppress the expense, and it is possible to effectively initialize the optical disc.

Figure 21:
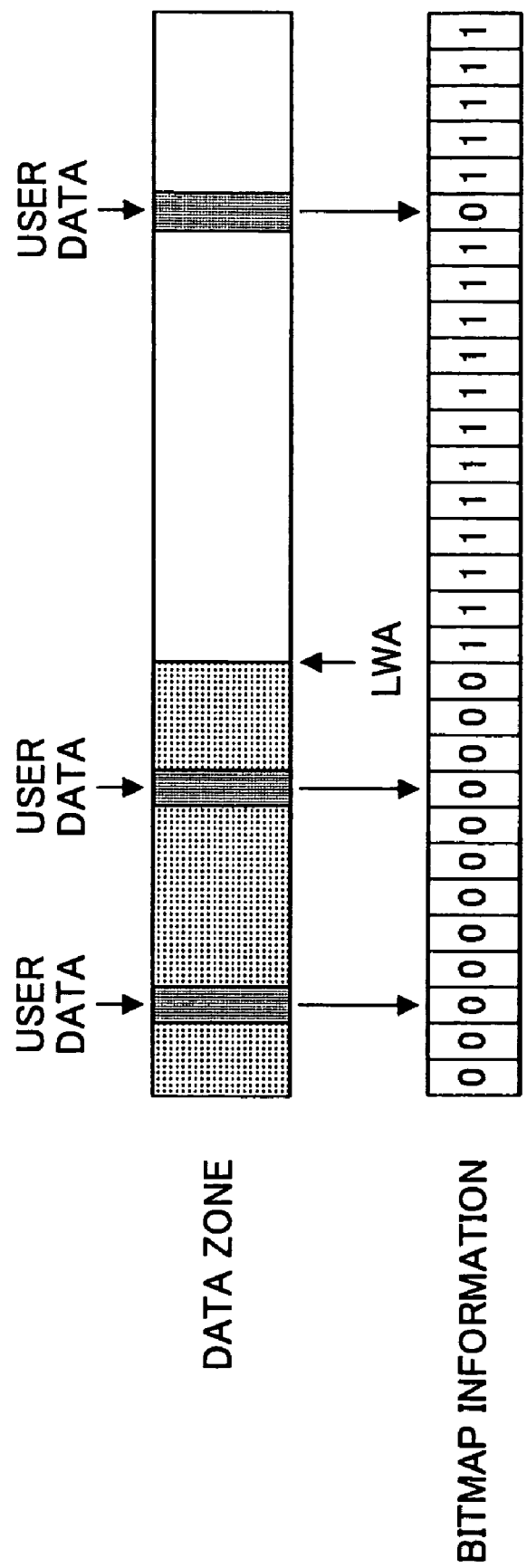
FIG. 21 is a diagram showing conventional bitmap information according to the embodiment of the present invention.

Moreover, in the present invention, instead of the conventional bitmap information, the UD bitmap information is applied in the data structure showing that the user data are recorded when the bit is "0" and the user data are not recorded when the bit is "1". By this data structure, it can be easily identified whether or not the user data are recorded. It should be noted that in the conventional bitmap information, as shown in FIG. 21, the bit showing "1" indicates that data are not recorded and the bit showing "0" indicates that data are recorded. That is, since the area records data (dummy data or user data) at the inner peripheral side more than the LWA, the bit shows "0". Accordingly, it is not required to identify whether the data being recorded are the user data or the dummy data.

Moreover, the identification ID information including the UD bitmap information is recorded to the optical disc 15. Accordingly,. even if the optical disc 15 is ejected in the middle of the BGF process and is loaded again, the BGF process can be properly resumed. In this case, since the identification ID information is recorded to the Replace Identification ID Area (new area), when the identification ID information is not normally recorded, even if an area for the identification ID information becomes the defective area due to a posteriori reason, it is possible to obtain the identification ID information.

Furthermore, in a case of reproducing data from the optical disc 15 that is initialized at least partially, when the indicated area is not normally reproduced, the reproduction retry is conducted by referring to the UD bitmap information only when the data recorded in the indicated area are the user data. On the other hand, the dummy data are returned when the data recorded in the indicated area are the dummy data. Accordingly, it is possible to prevent a process at a user side from being cancelled. As a result, a higher expense is not required, and it is possible to effectively reproduce data from the optical disc 15.

Moreover, in a case in that the indicated area is not normally reproduced, when data recorded in the indicated area are the dummy data, the dummy data are recorded to the replacement block of the indicated area. Accordingly, when the reproduction request is again conducted for the same indicated area, it is possible to return the dummy data immediately.

Furthermore, when the defect detection process is completed, the UD bitmap information is set to be invalid. Since an occurrence probability of the reproduction error becomes smaller after the defect detection process, it is possible to effectively reproduce data from the optical disc 15 without referring to the UD bitmap information.

In this embodiment, a case in which the defect detection process is successively conducted after the BGF process is completed is described above. Alternatively, the defect detection process can be conducted when the defect detection request command is received from the upper apparatus 90.

Moreover, in this embodiment, a case in which the UD bitmap information is set to be invalid when the defect detection process is completed is described above. Alternatively, the UD bitmap information may not be set to be invalid due to a characteristic of the optical disc 15.

<<First Variation of Reproduction Process>>

Figure 19:
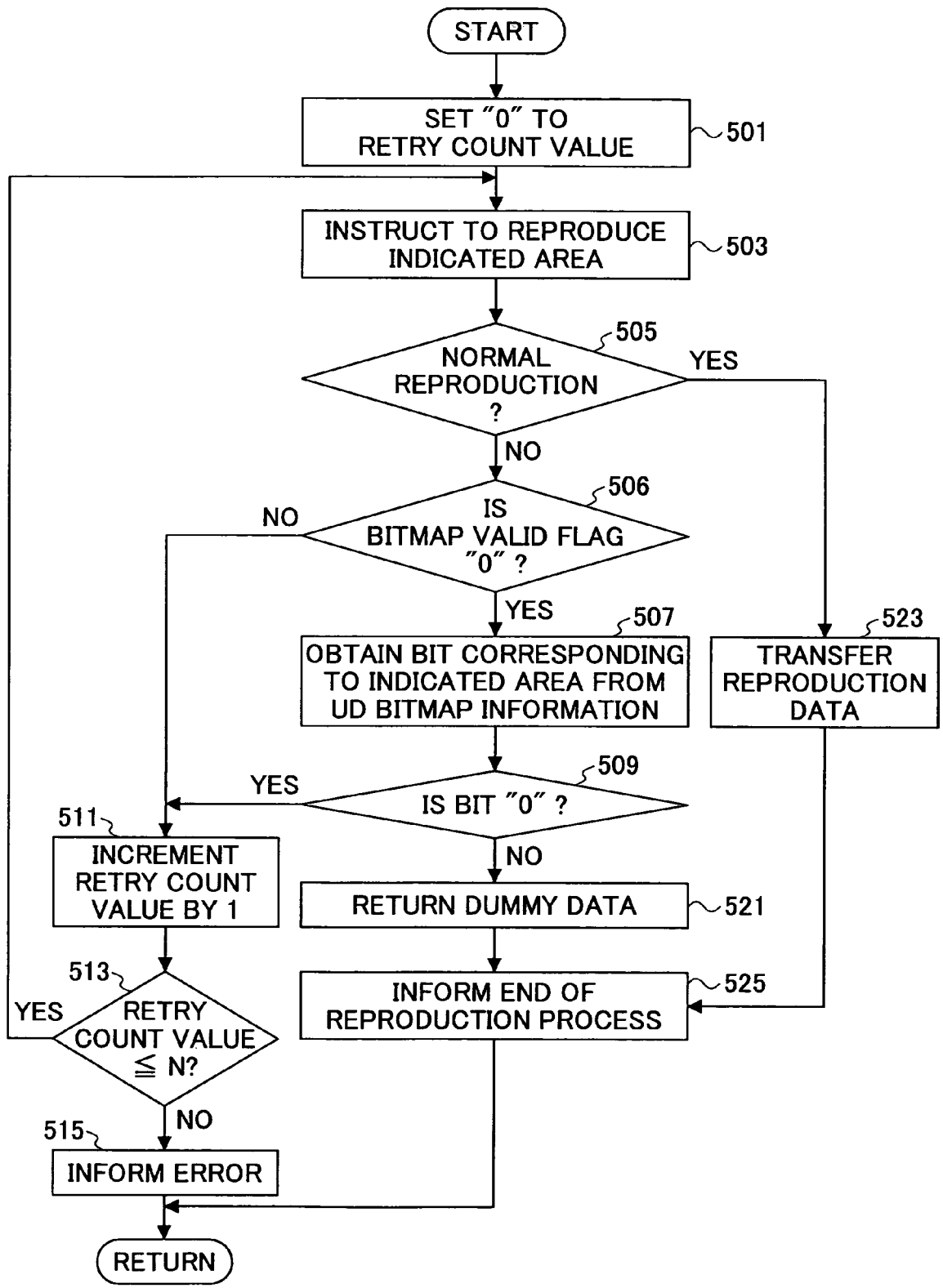
FIG. 19 is a flowchart for explaining a first variation of the reproduction process in FIG. 7, according to the embodiment of the present invention.

In the reproduction process in the embodiment, in a case in that the Replacement Area is not provided to the optical disc 15, as shown in FIG. 19, the step 517 and the step 519 (FIG. 15) of the above-described reproduction process can be omitted.

<<Second Variation of Reproduction Process>>

Figure 20:
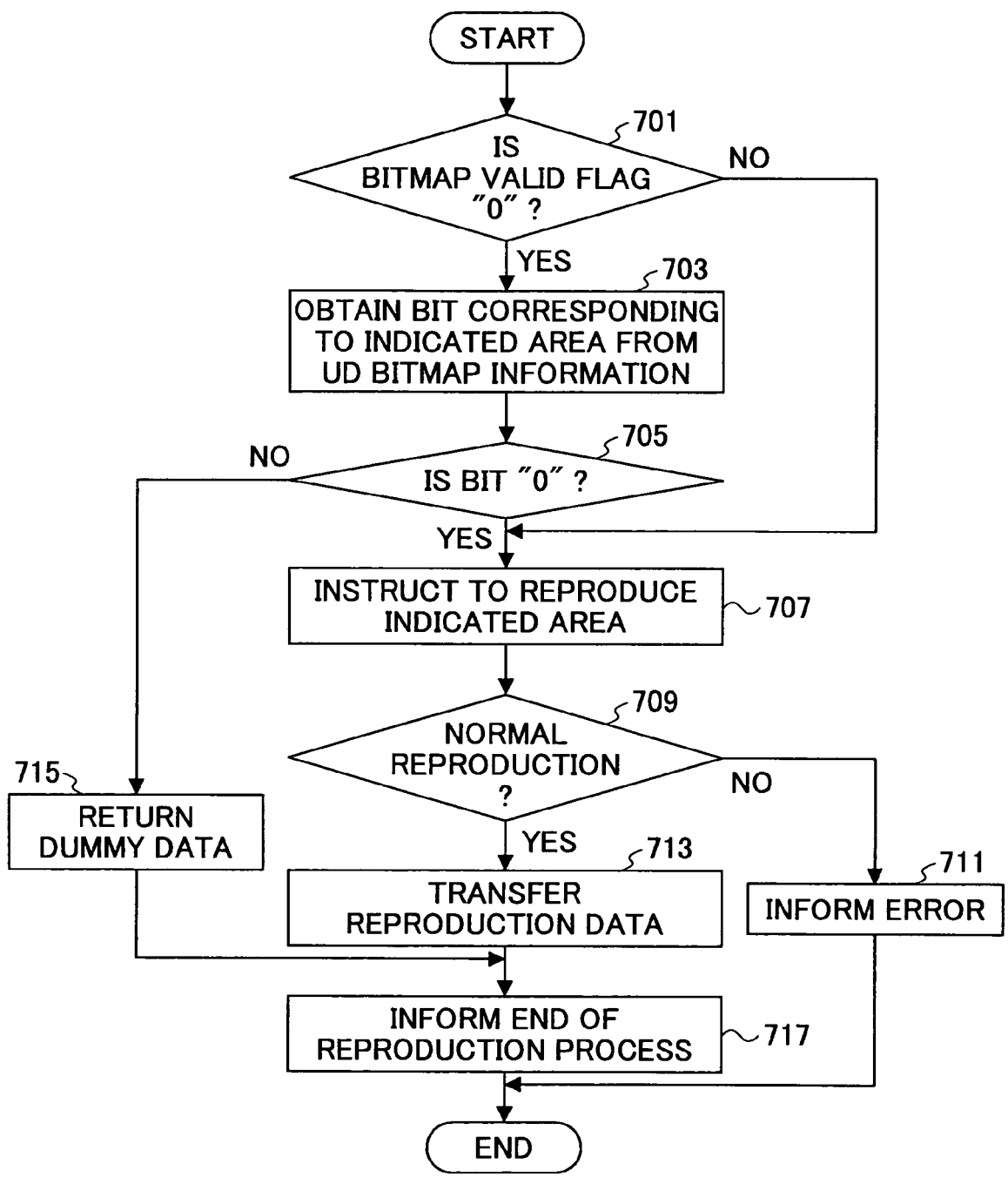
FIG. 20 is a flowchart for explaining a second variation of the reproduction process in FIG. 7, according to the embodiment of the present invention.

Moreover, in the embodiment, a case in which the reproduction retry is conducted when the user data has the reproduction error is described above. Alternatively, instead of conducting the reproduction retry, the reproduction error may be informed to the upper apparatus 90. In this case, one example of the reproduction process will be described with reference to a flowchart shown in FIG. 20.

In the first step 701, it is determined whether or not the bitmap valid flag is "0". If the bitmap valid flag is "0", this determination is positive, and the reproduction process advances to step 703.

In the step 703, a bit corresponding to an indicated area showing a reproduction address is retrieved from the UD bitmap information.

In the next step 705, it is determined whether or not the retrieved bit is "0". If the bit is "0", this determination is positive, and the reproduction process advances to step 707.

In the step 707, it is instructed to reproduce the indicated area.

In the next step 709, it is determined whether or not the indicated area is normally conducted. If the indicated area is normally conducted, this determination is negative, and the reproduction process advances to step 711.

In the step 711, an error is informed to the upper apparatus 90. Then, the reproduction process is terminated.

It should be noted that in the step 709, if the indicated area is normally reproduced, this determination is positive, and the reproduction process advances to step 713.

In the step 713, the reproduction data are transferred to the upper apparatus 90, and the reproduction process advances to step 717.

In the step 717, an end of the reproduction process is informed to the upper apparatus 90. Then, the reproduction process is terminated.

Moreover, in the step 705, if the bit is "1", this determination is negative, and the reproduction process advances to step 715.

In the step 715, the dummy data are returned to the upper apparatus 90, and the reproduction process goes to the step 717.

Furthermore, in the step 701, if the bitmap valid flag is "1", this determination is negative, and the reproduction process advances to the step 707.

In the embodiment and the first and second variations, a case in that the optical disc 15 is the DVD+RW is described above. However, the present invention is not limited to the DVD+RW, and can be applied to other DVDs, CDs, and next generation information recording media supporting a wavelength of approximate 405 nm of light.

Moreover, in the embodiment and the first and second variations, a case in that the information recording medium is the optical disc 15 is described above. However, the present invention is not limited to the optical disc 15, and can be applied to other information recording media. In this case, instead of the optical disc apparatus, an information recording apparatus supporting an information recording medium is used.

Furthermore, in the embodiment and the first and second variations, the program according to the present invention is recorded in the flash memory 39. However, the program according to the present invention can be recorded to other recording media (CD, magneto-optical disc, DVD, memory card, USB memory, flexible disk, or a like). In this case, the program according to the present invention is loaded into the flash memory 39 through a reproduction apparatus (or special interface) supporting respective recording medium. Alternatively, the program according to the present invention is transferred to the flash memory 39 through a network (LAN, Intranet, Internet, or a like). After all, the program according to the present invention is stored in the flash memory 39.

Moreover, in the embodiment and the first and second variations, a case in that the optical pickup device 23 is provided with one semiconductor laser is described above. However, the optical pickup device 23 is not limited to this configuration, and can be provided with a plurality of semiconductor lasers illuminating light fluxes having different wavelengths from each other, for example. In this case, for example, the optical pickup device 23 may include at least one of a semiconductor laser illuminating a light flux having a wavelength of approximately 405 nm, a semiconductor laser illuminating a light flux having a wavelength of approximate 660 nm, and a semiconductor laser illuminating a light flux having a wavelength of approximate 780 nm. That is, the optical disc apparatus 20 can be an optical disc apparatus supporting various types of optical discs compliant with different standardsf from each other. In this case, the BGF process described above may be conducted for at least one of the optical discs being different type from each other.

The present invention is not limited to the specifically disclosed embodiments, and variations and modifications may be made without departing from the scope of the present invention.

The present application is based on the Japanese Priority Application No. 2004-116503 filed on Apr. 12, 2004, the entire contents of which are hereby incorporated by reference.

What is claimed is:

1. An initialization method for initializing an information recording medium including a data zone, a replacement area, and a management information area storing management information of the data zone by recording dummy data by a block unit having a predetermined data size to a non-recorded area of the information recording medium, comprising the steps of:
determining a block to record the dummy data by referring to identification information for identifying a block recording user data and a block in which the user data are not recorded, and information concerning a last address of a recorded area continued from a beginning of the data zone; and
recording the dummy data to the block being determined in the step of determining a block to record the dummy data;
checking for a defect in the data zone; and
replacing a defective block where the defect is detected with a replacement block in the replacement area, referring to the identification information, and recording the dummy data to the replacement block when the defective block is not the block where the user data are recorded;
wherein the management information includes a check information showing whether or not the identification information is valid; and
the check information is set to show that the identification information is invalid, when a defect detection in the data zone is completed.

2. The initialization method as claimed in claim 1, further comprising the step of writing the identification information to the information recording medium.

3. The initialization method as claimed in claim 2, wherein in the step of writing the identification information, when a possible area to write includes a defect, the identification information is written to a new area, which is predetermined.

4. The initialization method as claimed in claim 3, further comprising the step of setting the identification information when the user data are recorded, prior to the step of determining a block to record the dummy data.

5. A reproduction method for reproducing data recorded in an information recording medium having a replacement area, by a block unit having a predetermined data size, said reproduction method comprising the steps of:
initializing the information recording medium, wherein the step of initializing the information recording medium includes the steps of:
determining a block to record dummy data by referring to identification information for identifying a first block recording user data and a second block in which the user data are not recorded, and information concerning a last address of a recorded area continued from a beginning of a data zone;
recording the dummy data to the block being determined in the step of determining the block to record the dummy data;
writing the identification information to the information recording medium; and
setting the identification information when the user data are recorded, prior to the step of determining a block to record the dummy data,
checking whether or not a reproduction block including a subject area to reproduce is a block recording the user data, based on the identification information when the information recording medium is initialized,
checking for a defect in the data zone; and
replacing a defective block where the defect is detected with a replacement block in the replacement area, referring to the identification information, and recording the dummy data to the replacement block when the defective block is not the block where the user data are recorded;
wherein the management information includes a check information showing whether or not the identification information is valid;
the check information is set to show that the identification information is invalid, when a defect detection in the data zone is completed, and
the information recording medium, which is partially initialized in the step of initializing the information recording medium, is reproduced by the block unit.

6. The reproduction method as claimed in claim 5, further comprising the step of setting the dummy data as reproduction data when the reproduction block is not a block recording the user data.

7. The reproduction method as claimed in claim 5, further comprising the step of retrying a reproduction of the reproduction block when reproduction of the reproduction block is not normally completed, and the reproduction block is a block recording the user data.

8. The reproduction method as claimed in claim 5, further comprising the step of informing error information when the reproduction of the reproduction block is not normally completed, and the reproduction block is a block recording the user data.

9. The reproduction method as claimed in claim 5, further comprising the step of replacing the reproduction block with a replacement block in a replacement area, and recording the dummy data to the replacement block, when the reproduction of the reproduction block is not normally completed, and the reproduction block is not the block recording the user data,
wherein the information recording medium includes the replacement area.

10. A computer-readable recording medium recorded with a program for causing a computer as an information recording apparatus to record data by a block unit having a predetermined block to an information recording medium including a data zone, a replacement area and a management information area storing management information of the data zone, said program comprising the codes for:
setting identification information for identifying a block recording user data and a block where the user data are not recorded, when an initialization process for recording dummy data to a non-recorded area of the information recording medium is interrupted, and the user data is recorded;
determining a block to record the dummy data by referring to the identification information and information concerning a last address of a recorded area continued from a beginning of the data zone, when the dummy data are recorded;
checking for a defect in the data zone; and
replacing a defective block where the defect is detected with a replacement block in the replacement area, referring to the identification information, and recording the dummy data to the replacement block when the defective block is not the block where the user data are recorded;

wherein the management information includes a check information showing whether or not the identification information is valid; and the check information is set to show that the identification information is invalid, when a defect detection in the data zone is completed.

11. An information recording apparatus for recording data by a block unit having a predetermined block to an information recording medium including a data zone, a replacement area, and a management information area storing management information of the data zone, said information recording apparatus comprising:

a setting part setting identification information for identifying a block recording user data and a block where the user data are not recorded, when an initialization process for recording dummy data to a non-recorded area of the information recording medium is interrupted, and the user data is recorded;

an address information obtaining part obtaining information concerning a last address of a recorded area continued from a beginning of the data zone;

a determining part determining a block to record the dummy data based on the identification information and the information concerning the last address of a recorded area continued from a beginning of the data zone, when the dummy data are recorded;

a defect detection part detecting a defect in the data zone; and a replacing part replacing a defective block where the defect is detected by the defect detecting part with a replacement block in the replacement area, referring to the identification information, and recording the dummy data to the replacement block when the defective block is not the block where the user data are recorded;

wherein the information recording medium includes a replacement area;

the management information includes a check information showing whether or not the identification information is valid; and the defect detecting part sets the check information to show that the identification information is invalid, when a defect detection in the data zone is completed.

12. The information recording apparatus as claimed in claim 11, wherein the identification information includes a plurality of bits corresponding to a plurality of the blocks, respectively.

13. The information recording medium as claimed in claim 11, further comprising an information writing part writing the identification information to the information recording medium.

14. The information recording apparatus as claimed in claim 13, wherein the information writing part writes the identification information to the management information area.

15. The information recording apparatus as claimed in claim 13, wherein the information writing part writes the identification information to a new area, which is predetermined, when a possible area to write the identification information has a defect.

16. An information reproducing apparatus for reproducing data recorded in an information recording medium having a replacement area, by a block unit having a predetermined data size, said information reproducing apparatus comprising:

an initialization part initializing the information recording medium, wherein the initialization part comprises:

a determining part determining a block to record dummy data by referring to identification information for identifying a first block recording user data and a second block in which the user data are not recorded, and information concerning a last address of a recorded area continued from a beginning of a data zone;

a recording part recording the dummy data to the block being determined in the step of determining a block to record the dummy data;

a writing part writing the identification information to the information recording medium; and a setting part setting the identification information when the user data are recorded, prior to the step of determining a block to record the dummy data, and a reproducing part reproducing a reproduction block including a subject area to reproduce;

a checking part checking whether or not the reproduction block is a block recording the user data, based on the identification information which is set when the information recording medium is initialized; and a processing unit for conducting a process corresponding to at least one of a check result of the checking part and a reproduction result of the reproducing part, a defect detection part detecting a defect in the data zone; and a replacing part replacing a defective block where the defect is detected by the defect detecting part with a replacement block in the replacement area, referring to the identification information, and recording the dummy data to the replacement block when the defective block is not the block where the user data are recorded;

wherein the information recording medium includes a replacement area;

the management information includes a check information showing whether or not the identification information is valid;

the defect detecting part sets the check information to show that the identification information is invalid, when a defect detection in the data zone is completed; and wherein the information recording medium, which is partially initialized in the step of initializing the information recording medium, is reproduced by the block unit.

17. The information reproducing apparatus as claimed in claim 16, wherein the processing unit returns the dummy data when the reproduction block is not the block recording the user data.

18. The information reproducing apparatus as claimed in claim 16, wherein the processing unit instructs a reproduction retry to the reproducing part, when a reproduction by the reproducing part is not normally completed, and the reproduction block is the block recording the user data.

19. The information reproducing apparatus as claimed in claim 16, wherein the processing unit informs error information when a reproduction by the reproducing part is not normally completed, and the reproduction block is the block recording the user data.

20. The information reproducing apparatus as claimed in claim 16, wherein:

the information recording medium includes a replacement area; and the processing unit replaces the reproduction block with a replacement block in the replacement area, and records the dummy data to the replacement block, when a reproduction by the reproducing part is normally completed, and the reproduction block is not the block recording the user data.

* * * * *